May 15, 1928.

S. M. KINTNER 1,669,524

SPEED CONTROL SYSTEM FOR HIGH FREQUENCY GENERATORS

Filed Nov. 2, 1921

WITNESSES:

INVENTOR
Samuel M. Kintner
BY
ATTORNEY

Patented May 15, 1928.

1,669,524

UNITED STATES PATENT OFFICE.

SAMUEL M. KINTNER, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-CONTROL SYSTEM FOR HIGH-FREQUENCY GENERATORS.

Application filed November 2, 1921. Serial No. 512,193.

My invention relates to speed-regulating systems and more especially to such systems as may be employed in connection with high-frequency alternators.

An object of my invention is to provide an improved system of speed-control for machines requiring the utmost constancy in speed.

A further object of my invention is to produce mechanical indications of small variations in the frequency of a high-frequency source.

A still further object of my invention is to provide a speed or frequency-indicating or controlling system in which a very high degree of sensitivity is secured by utilizing the heterodyne principle and rectifying the heterodyned current to obtain an alternating current in which the variations in frequency may be accurately measured.

With these and other objects in view, my invention consists in the combinations and in the details of construction hereinafter described and claimed and illustrated in the accompanying drawing, wherein:

Figure 1:
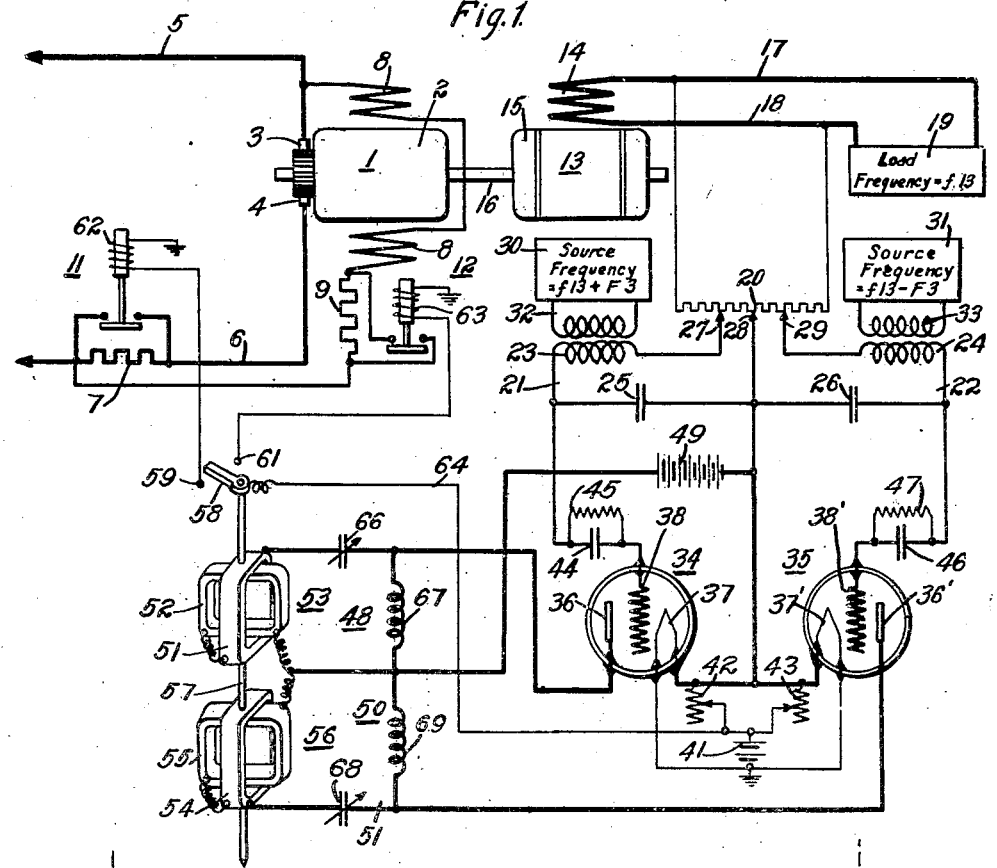
Figure 1 is a diagrammatic view of circuits and apparatus employing a preferred form of my invention.

In Fig. 1 is shown a driving motor 1, such, for example, as a direct-current motor comprising an armature member 2 having brushes 3 and 4 which are connected, by conductors 5 and 6, to a source of energy (not shown) through a resistor 7. A field winding 8 and a resistor 9 are serially included in a circuit which is connected in shunt around the resistor 7 and the motor 1. Relays 11 and 12 may be selectively rendered effective to shunt resistors 7 and 9, respectively, for controlling the speed of the motor, as hereinafter explained.

A high-frequency alternator 13, having a normal frequency $f_{13}$ which it is desired to maintain constant within as close limits as possible, comprises armature windings 14 and a rotor member 15 which is operatively connected to the motor armature 2 by means of a common shaft 16. The armature windings 14 are connected, by conductors 17 and 18, to a work circuit 19 which may be a circuit utilizing the alternator 13 as a source of high-frequency power for transmitting radio signals or as a heterodyning source in a wireless receiving station (not shown).

As a means for securing a small amount of high-frequency energy from the alternator for energizing my speed-controlling device, I have connected a resistor 20 in shunt relation to the conductors 17 and 18, though it is apparent that an inductance coil or a series of condensers may be employed in place of the resistor 20.

The resistor 20 is tapped by a pair of circuits 21 and 22 comprising coupling coils 23 and 24 and condensers 25 and 26, respectively, and carrying currents of generator frequency $f_{13}$ by reason of the adjustable connections 27, 28 and 28, 29 to the resistor 20. In the embodiment shown, no attempt is made to secure resonant conditions in the circuits 21 and 22, as it is frequently best to have them operating under non-resonant conditions.

The circuits 21 and 22 are heterodyned, respectively, with suitable constant-frequency sources 30 and 31, such, for example, as thermionic oscillation-generator systems of great constancy of frequency or the like, which are inductively associated with the coils 23 and 24 through coupling coils 32 and 33, respectively. One of the heterodyning sources, as 30, has a frequency which is greater than that of the alternator 13 by a small amount $F_3$, while the other heterodyne source, as 31, has a frequency which is smaller than that of the alternator 13 by a similar amount $F_3$ whereby similar beat-frequencies $F_3$ are produced in the circuits 21 and 22, but with this distinction that one is decreased while the other is increased upon a departure of the alternator 13 from the constant frequency $f_{13}$.

The high-frequency currents with beat-frequency envelopes, obtained in circuits 21 and 22, are converted into alternating-currents of the beat frequency $F_3$ by means of a pair of thermionic tubes 34 and 35 comprising anodes 36 and 36', cathodes 37 and 37', and grid members 38 and 38', respectively. The cathodes 37 and 37' may be energized from a common source of energy 41 through rheostats 42 and 43, respectively.

The grid circuits of the tubes 34 and 35 are connected across the condensers 25, 26 of the circuits 21, 22, through blocking condensers 44, 46, shunted by leaks 45, 47, respectively. While blocking condensers with grid leaks are specifically mentioned, for obtaining a negative grid bias, my invention is not to be limited to such means.

A plate-filament circuit for the tube 34 includes a source of energy 49 and the stationary and movable coils 51, 52, of a dynamometer relay 53. Similarly, a plate-filament circuit for the tube 35 includes the source of energy 49 and the stationary and the movable coils 54, 55 of a second dynamometer relay 56, which is mounted upon the same shaft 57 as the relay 53, the two relays producing opposing torques. The relay shaft 57 carries a switch arm 58 which coacts with the stationary contact members 59 and 61 to effect the operation of the relays 11 and 12 respectively, thereby accelerating or retarding the speed of the motor.

The stationary contact member 59 is conveniently connected to one terminal of the source of energy 41 through actuating winding 62 of the relay 11 and ground, while the stationary contact member 61 is similarly connected through actuating winding 63 of the relay 12 and ground. The movable contact arm 58 is connected by conductor 64 to the remaining terminal of said source of energy 41.

The actuating windings 51 and 52 of the relay 53 are included in a circuit 48, which is resonant at a frequency $F_1$, somewhat less than the beat-frequency $F_3$, and which also includes a serially connected condenser 66 and a by-pass inductance coil 67, the latter being connected across the series-connected windings 51 and 52 and the condenser 66. Similarly, the remaining actuating windings 54 and 55 of the relay 56 are included in a circuit 50 which is resonant at the same frequency $F_1$ and which also includes a serially connected condenser 68 and a by-pass inductance coil 69, the latter being connected across the series-connected windings 54 and 55 and the condenser 68.

In operation, the speed-controlling relays 11 and 12 are normally de-energized when the alternator frequency $f_{13}$ is at its correct value. If, however, the alternator frequency should, from any cause, increase to a value $F_{13}+a$, the beat-frequency $F_{48}$ in circuits 21 and 48 would decrease by the amount $a$, while the beat-frequency $F_{50}$ in circuits 22 and 50 would increase by the amount $a$. It is at once apparent that the ratio of the change in frequency in the beat-frequency circuits 48 and 50 is very much greater than that in the circuit of the alternator 13, since the beat-frequency $F_3$ is very much smaller than the alternator frequency $f_{13}$.

Figure 2:
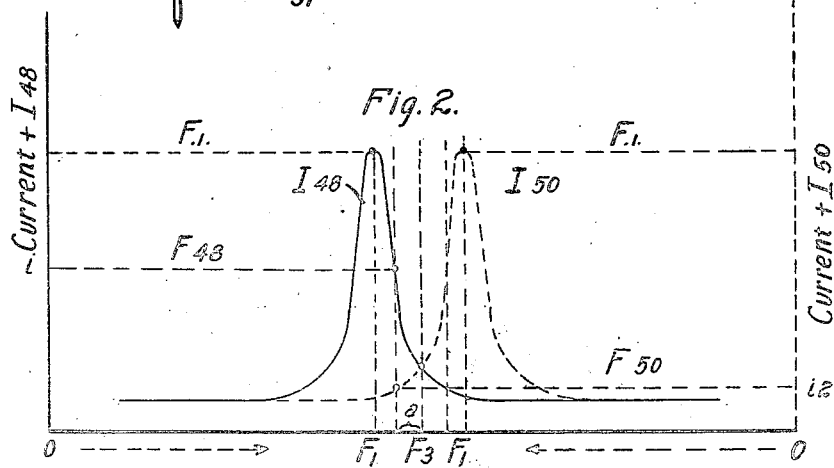
Fig. 2 is a view showing the resonance curves of the beat-frequency circuits including the actuating windings of the relay.

Hence, a very small increase $a$ in the alternator frequency causes the current $I_{48}$ in circuit 48 to increase to a value $i$, while the current $I_{50}$ in circuit 50 decreases to a value $i^2$, as indicated in Fig. 2. The contact arm 58 is actuated, by the resultant unbalancing of the relays 53 and 56, to engage contact 61, which, in turn, energizes the relay 12 and reduces the speed of the driving motor 1. In a similar manner, the relay 11 is energized to increase the speed of the motor if the alternator frequency decreases by the small amount $a$.

It will be understood that my invention, in its broader aspects, is not to be limited to the specific heterodyning sources indicated at 30 and 31 inasmuch as they are intended to represent any available source and one of them could be derived from the incoming signaling currents of a radio-receiving station.

The extremely high sensitivity of my speed-control system may be illustrated in the following example. It will be assumed, for instance, that the generator frequency is $f_{13}=20,000$ cycles per second and that the local heterodyne-source frequencies are 20,100 and 19,900, respectively. Then, upon the interaction of the several currents and the rectification in the thermionic devices 34 and 35, beat-frequency currents of $F_3=100$ cycles per second are normally caused to traverse the circuits 48 and 50. The normal beat-frequency $F_3$, it will be noted, is thus 1/2 of 1% of the alternator frequency $f_{13}$. Furthermore, it is apparent that a change in the alternator frequency of 1/2 of 1% causes a variation in the beat-note frequency of 100%.

Assuming that a condition exists in the resonant circuits wherein a 5% change in frequency causes a sufficient change in current to actuate the relay, it can readily be seen that actuating forces necessary to operate the relay are produced with 1/40 of 1% change in the alternator frequency. Thus, while utilizing resonant circuits sensitive only to 5% frequency variations, I am able, by my invention, to maintain the frequency of the high-frequency alternator constant to within plus or minus 1/40 of 1% of the desired frequency.

While I have shown but one embodiment of my invention, for the purpose of describing the same and illustrating its principles, it is apparent that various changes and modifications may be made therein without departing from the spirit thereof and I desire, therefore, that only such limitations shall be imposed upon my invention as are indicated in the appended claims, when considered in view of the prior art.

I claim as my invention:—

1. The method of mechanically indicating a departure of a high-frequency circuit from a predetermined constant frequency, including the steps of heterodyning currents from said circuit with a pair of auxiliary constant-frequency sources, one of said sources having a frequency higher than said circuit and the other having a frequency lower than said circuit, deriving an actuating force in accordance with the departure of each of the resultant beat-note frequencies from a predetermined value, and causing said actuating forces to be differentially combined.

2. In a system for mechanically indicating small variations in frequency, the combination with a high-frequency circuit, of a pair of auxiliary high-frequency sources, one of said sources having a frequency higher than that of said circuit and the other having a frequency lower than that of said circuit, means for heterodyning currents from said sources with currents from said circuit, means for deriving an actuating force in accordance with the departure of the resultant beat-note frequencies from a predetermined value, and means for differentially combining said actuating forces.

3. In a system for mechanically indicating small variations in frequency, the combination with a high-frequency circuit, of a pair of auxiliary high-frequency sources, means for heterodyning currents from said sources with currents from said circuit, means for deriving actuating forces varying in opposite directions in response to variations in the respective beat-note frequencies, and means for differentially combining said actuating forces.

4. The combination with a high-frequency source, of means for deriving therefrom controlling currents having a fractional electromotive force substantially in phase therewith, an auxiliary high-frequency source, a non-resonant heterodyning circuit coupled to said means and to said auxiliary source, rectifying means associated with said heterodyning circuit for producing an alternating component current of beat frequency, and current-responsive means including capacitive and inductive reactors tuned to a frequency slightly different from said beat frequency for mechanically indicating small changes in said beat frequency.

5. The combination with an alternating-current source, of means for mechanically indicating small variations in the frequency thereof, said means comprising two circuits normally having similar frequencies, means for causing the frequencies of said circuits to vary in opposite directions in response to variations in the frequency of said source, and differentially-connected current-responsive indicating means including resonant means tuned to a single frequency slightly different from the frequencies of said circuits operatively associated therewith.

6. In a speed-controlling system, the combination with a device, the speed of which is to be controlled, of means associated therewith for deriving two alternating-current electromotive forces, one of said electromotive forces increasing in frequency in response to increases in said speed, and the other of said electromotive forces decreasing in frequency in response to increases in said speed, resonant-circuit means associated with said electromotive forces in such manner that one of said electromotive forces approaches fully resonant conditions while the other recedes therefrom, in response to changes in said speed, and differentially-connected current-responsive means associated with said electromotive forces for controlling said speed.

7. In an electrical system, a source of power, an alternating-current generator driven thereby, a pair of circuits carrying currents generated by said generator, a local generator associated with each circuit for causing the passage of currents of beat frequency, said local generator frequencies being, respectively, above and below said first-mentioned generator frequency, and means responsive to variations in the beat-frequency in each circuit for effecting changes in the energy supplied to said source of power tending to counteract said generator frequency changes.

8. In an electrical system, a motor, an alternating-current generator driven thereby, a pair of circuits carrying currents generated by said generator, a pair of oscillation generators, one generator for each circuit, the frequencies of the currents generated by said oscillation generators being, respectively, slightly above and below the frequency of the first mentioned generator, whereby beat currents are formed in each of said circuits, and means responsive to relative changes in the frequencies of said beat currents incident to fluctuations in the speed of the driving motor for impressing corrective influences upon said motor.

9. In an electrical system, the combination with a dynamo-electric machine and an alternating-current generator driven thereby, of separate circuits associated with said generator, an oscillation generator associated with each circuit for producing beat currents of similar frequencies, the frequencies of said oscillation generators being respectively slightly above and slightly below said alternating-current generator frequency, and means responsive to relative changes in the frequency of said beat currents incident to fluctuations in the alternating-current generator frequency for impressing corrective influences upon said dynamo-electric machines substantially in synchronism with said fluctuations.

10. In an electrical system, the combination with a source of power and an alternating-current generator driven thereby, of separate circuits deriving energy from said generator, an oscillation generator associated with each circuit and adapted to produce currents of similar beat-frequencies, the frequencies of said oscillation generators being, respectively, above and below that of said alternating-current generator, means for deriving alternating currents of beat-frequency from said separate circuits and means responsive to relative changes in the frequency of said beat-frequency currents incident to fluctuations in said alternating-current generator frequency for applying corrective influences to said source of power.

11. A regulator system comprising a source of power, an alternating-current generator driven thereby, separate circuits deriving energy from said generator, an oscillation generator associated with each circuit and adapted to produce currents of similar beat-frequencies, the frequencies of said oscillation generators being, respectively, above and below that of said alternating-current generator, means associated with each of said separate circuits for deriving alternating currents of beat frequency therefrom, a pair of translating circuits operatively associated with said last-mentioned means and means associated with said translating circuits for counteracting variations in the relative beat-frequencies of the current in each translating circuit incident to changes in the alternating-currents generator frequency.

12. A regulator system comprising a source of power, an alternating-current generator driven thereby, separate circuits deriving energy from said generator, an oscillation generator associated with each circuit and adapted to produce currents of similar beat-frequencies, the frequencies of said oscillation generators being, respectively, above and below that of said alternating-current generator, means operatively connected to each of said separate circuits for deriving component currents of beat-frequency therefrom, means associated with said last-mentioned means, whereby variations in the relative beat-frequencies of said component currents incident to variation in the alternating-current generator frequency are translated into corresponding current variations, and control mechanism sensitive to said current variations for counteracting the alternating-current generator frequency variations.

13. In a regulator system, a generator of ultra-audio-frequency currents, a pair of circuits deriving energy therefrom, heterodyning means associated with each circuit for producing similar beat-frequencies therein, the frequencies of the heterodyning means being, respectively, above and below that of said generator, rectifying means associated with each circuit for producing variable currents of beat frequencies therefrom, a pair of circuits each including a resonant circuit associated with said last-mentioned means, said circuits being resonant to a frequency slightly different from said beat-frequency, whereby variations in the said beat-frequencies incident to fluctuations in said generator frequency cause opposite variations in the amplitude of the beat currents traversing said resonant circuits, and means responsive to said beat-current variations tending to correct said generator frequency variations.

14. In a regulator system, a generator of ultra-audio-frequency currents, a pair of circuits deriving energy therefrom, heterodyning means associated with each circuit for producing similiar beat-frequencies therein, the frequency of the heterodyning means being respectively above and below that of said generator, a pair of three-electrode tubes having plate-filament and grid-filament circuits, means for coupling said grid-filament circuits to said first-mentioned circuits, means included in each grid circuit for causing the beat-frequencies therein to be translated into currents of beat frequency in the associated plate-filament circuit, resonant means included in each plate-filament circuit, said resonant means being tuned to frequencies slightly different from said beat frequencies, whereby variations in said beat frequencies incident to fluctuations in said generator frequency causes variations in opposite directions in the amplitude of the beat currents in said pair of resonant means, and current-responsive means associated with said resonant means for correcting said generator frequency variations.

15. In a regulating system, the combination with a source of power and an ultra-audio frequency generator, of a pair of circuits deriving energy therefrom, heterodyning means associated with each circuit for producing similar beat-frequencies, the frequencies of the heterodyning means being, respectively, above and below the generator frequency, a pair of evacuated electric devices having plate-filament circuits, means for coupling said grid-filament circuits to said first-mentioned circuits, means included in each grid-filament circuit for causing the beat-frequencies therein to be translated into alternating currents of beat-frequency in each plate-filament circuit, a parallel-resonant circuit included in each plate-filament circuit and tuned to such frequencies that variations in said beat frequencies caused by fluctuations in said generator frequency produce opposite variations in the amplitude of the beat currents in said parallel-resonant circuits, and switching mechanism coacting with said source of power, whereby said current variations tend to correct said generator frequency fluctuations.

16. A frequency-sensitive instrument including a pair of current-actuated motor devices mechanically opposed to each other, circuits, one for each of said devices, the currents in said circuits being normally of the same frequency and normally keeping said devices in equilibrium, and means, including resonance devices in said circuit, whereby, upon the departure from normal frequency, one of said currents will increase and the other other decrease.

In testimony whereof, I have hereunto subscribed my name this 22nd day of October, 1921.

SAMUEL M. KINTNER.